United States Patent [19]
Nagashima et al.

[11] Patent Number: 5,460,350
[45] Date of Patent: Oct. 24, 1995

[54] ELECTROMAGNETIC VALVE DEVICE

[75] Inventors: Takashi Nagashima; Yoshiyuki Katoh; Hideki Yamamoto, all of Aichi, Japan

[73] Assignee: Aisin Seiki Kabushiki Kaisha, Kariya, Japan

[21] Appl. No.: 199,664

[22] Filed: Feb. 22, 1994

[30] Foreign Application Priority Data

Feb. 19, 1993 [JP] Japan .................................. 5-030511

[51] Int. Cl.⁶ .................................................. F16K 31/00
[52] U.S. Cl. ........................................ 251/129.15; 335/260
[58] Field of Search ...................... 251/129.01, 129.09, 251/129.1, 129.15; 335/260, 278

[56] References Cited

U.S. PATENT DOCUMENTS

| | | | |
|---|---|---|---|
| 3,331,042 | 7/1967 | Erickson et al. | 335/260 |
| 5,102,096 | 4/1992 | Siegel et al. | 335/278 X |
| 5,324,134 | 6/1994 | Kaes et al. | 403/218 |
| 5,333,946 | 8/1994 | Goossens et al. | 251/129.15 X |

FOREIGN PATENT DOCUMENTS

| | | |
|---|---|---|
| 831047 | 2/1952 | Germany . |
| 3810788 | 10/1989 | Germany . |
| 4013876 | 10/1991 | Germany . |
| 4030571 | 4/1992 | Germany . |

*Primary Examiner*—Martin P. Schwadron
*Assistant Examiner*—Kevin L. Lee
*Attorney, Agent, or Firm*—Oblon, Spivak, McClelland, Maier, & Neustadt

[57] ABSTRACT

In an electromagnetic valve device, in order to secure a core assembly to a housing, an annular spacer is used. The annular spacer is fitted between a conical inner surface of a receiving portion of the housing and a conical opening of a casing. Since the conical opening of the casing is mounted on a tapered surface of a stationary core accommodated in the receiving portion of the housing, the core assembly is secured to the housing.

9 Claims, 4 Drawing Sheets

20

20

ELECTROMAGNETIC VALVE DEVICE

BACKGROUND OF THE INVENTION

1. Field of the Invention

The present invention relates to an electromagnetic valve, and in particular to an electromagnetic valve which may be used as a brake fluid pressure regulating valve in an anti-lock brake system.

2. Description of the Related Art

A conventional solenoid valve or electromagnetic valve device is disclosed DE 4013876A1 published on Apr. 30, 1991. In this conventional device, a casing block or a housing has a bore with a reverse taper. A part of the valve body is secured with a casing of a coil assembly of the solenoid valve and the part has the same tapered shape as the bore. The part is fitted into the bore while leaving a gap therebetween. A sleeve is pushed into the gap, filling the gap down to the area of a back taper. The resultant or deformed sleeve holds the electromagnetic valve in place in the housing. Thus, a strong, easy-to-assemble positively locking connection suitable for joining the solenoid or electromagnetic valve to the housing is attained.

In such a structure, an outer portion of the part and an inner surface of the bore which define the gap area are in parallel relationship, and the casing of the coil assembly of the electromagnetic valve extends along the sleeve, which results in that the sleeve fails to establish a fluid-tight relationship between any portion of the electromagnetic valve and the housing. Thus, an additional sealing member is required therebetween. Such an additional sealing member increases the number of elements and requires cumbersome assembly work.

SUMMARY OF THE INVENTION

It is, therefore, an object of the present invention is to provide an electromagnetic valve device without the foregoing drawbacks.

Another object of the present invention is to provide an electromagnetic valve device wherein a core assembly as a main portion of an electromagnetic valve is connected to a housing in a fluid-tight relationship by a spacer.

In order to attain the foregoing objects, an electromagnetic control valve comprises a housing having fluid pressure passage. A receiving portion is formed in the housing and includes an opening positioned at the first side of the housing, a bottom portion and a conical inner surface adjacent to the fluid pressure passage. A core assembly is accommodated within the receiving portion and includes a stationary member having a bottom mounted on the bottom of the receiving portion and a conical outer surface. A valve body extends from the stationary member and serves for opening and closing the fluid pressure passage. A casing has a conical opening mounted on the conical outer surface of the stationary member. An annular spacer having a wedged cross-section is fitted between the conical inner surface of the receiving portion and the conical opening of the casing in order to press on the casing and establish a fluid-tight relationship between the conical opening and conical outer surface of the stationary member. A coil assembly is provided for moving the valve body.

DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENTS

Preferred embodiments of the present invention will be described hereinunder in detail in reference to the accompanying drawings.

Figure 1:
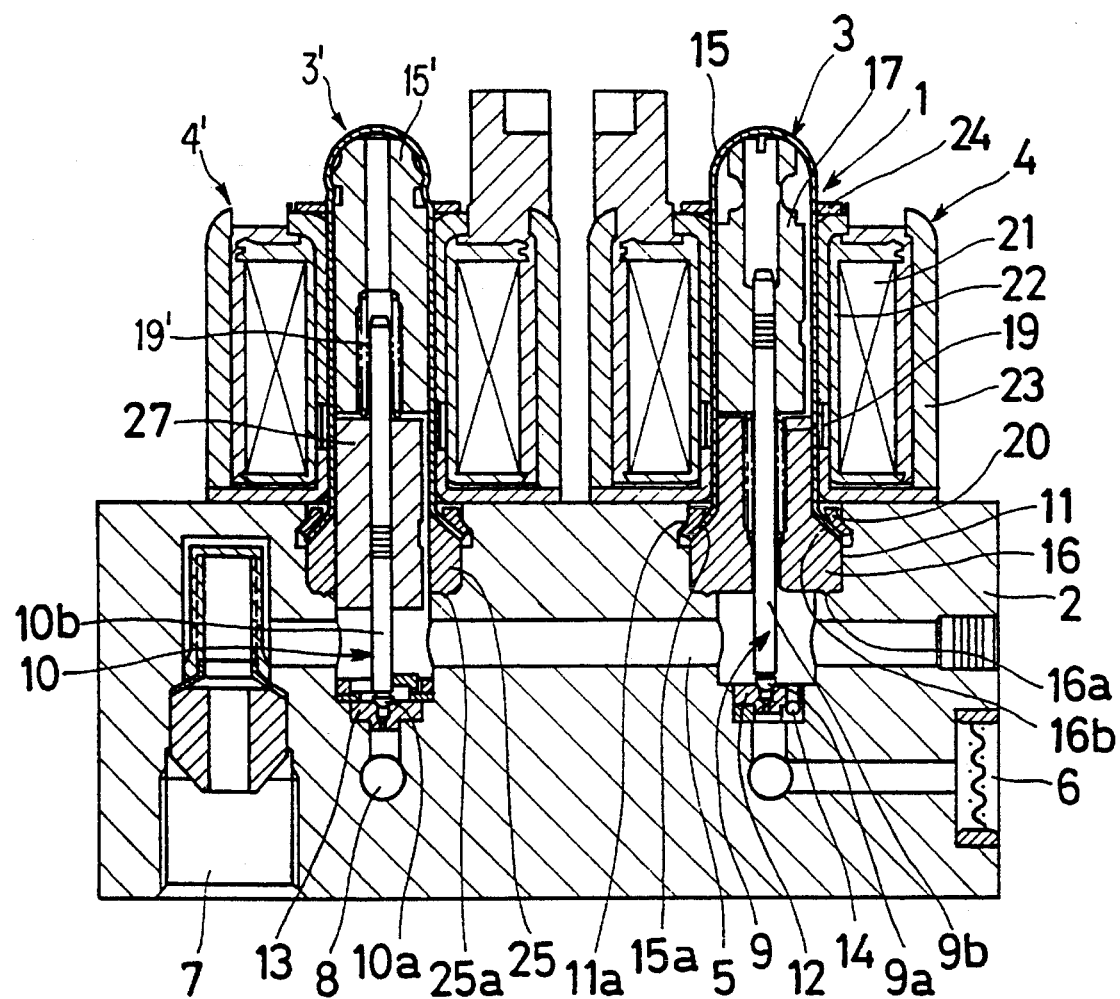
FIG. 1 is a cross-sectional view of an electromagnetic valve in accordance with the present invention.
Figure 2:
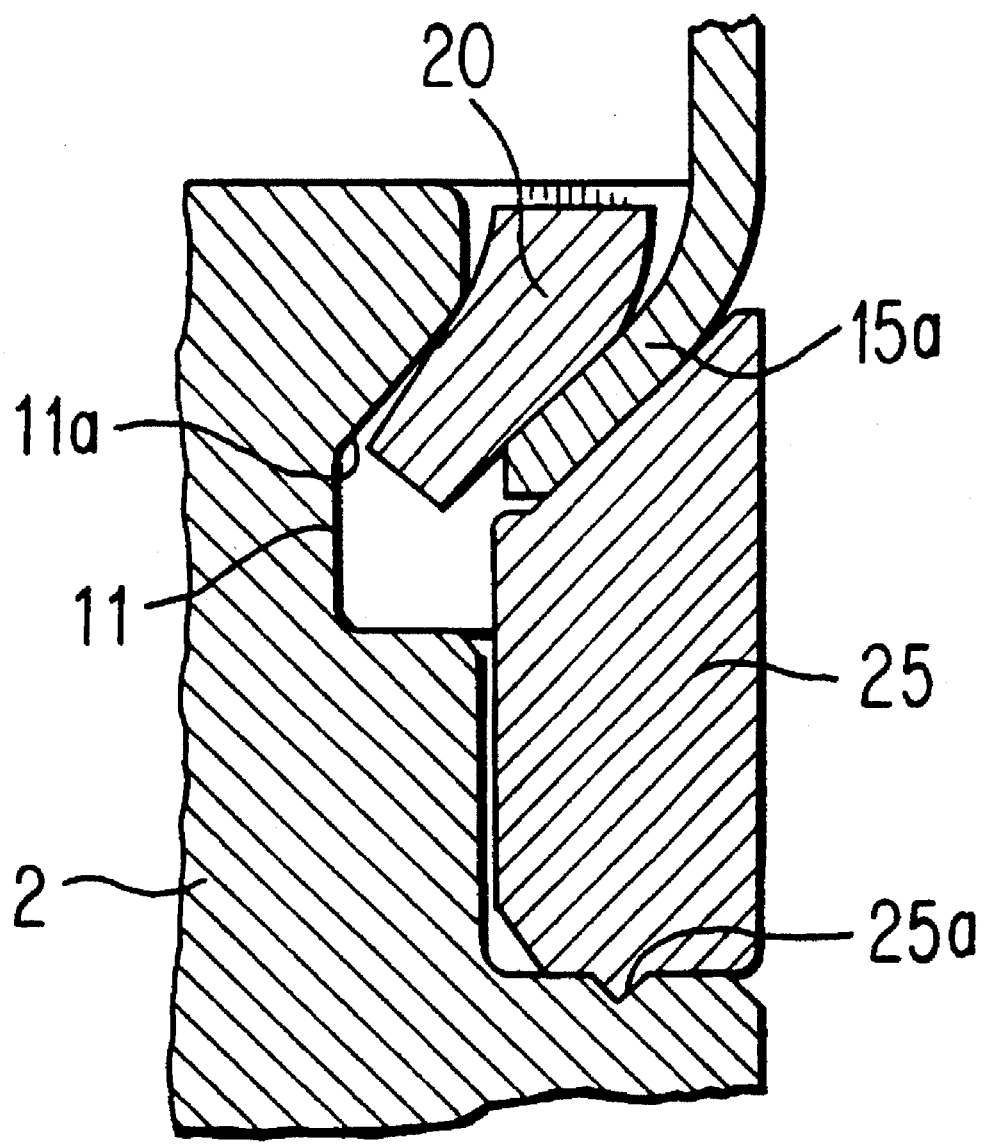
FIG. 2 is an enlarged view of a portion encircled by a phantom line in FIG. 1.

Referring first to FIGS. 1 and 2, an electromagnetic valve device, which may be used a component of antilock brake system or ABS (not shown), includes a housing 2, upstream and downstream core assemblies 3 and 3', and upstream and downstream coil assemblies 4 and 4'.

The housing 2 is made of an aluminum alloy in order to lighten the ABS. The housing 2 has an inlet port 6 and an outlet port 7 at its right end portion and a bottom portion, respectively. A fluid passage 5 is formed within the housing 2 and establishes fluid communication between the inlet port 6 and the outlet port 7. The inlet port 6 may be connected to a master cylinder (not shown) so as to be supplied with a fluid under pressure. The outlet port 7 may be connected to a wheel cylinder (not shown). In the housing 2, there is formed a drain passage 8 which may be in fluid communication with the inlet port 6 via a reservoir and a pump (both are not shown).

Fluid communication between the fluid passage 5 and the inlet port 6 is established only when an upstream valve 9 is opened. The upstream valve 9 is normally held open by a spring 19 and may be closed by energization of the core assembly 3 and coil assembly 4. Fluid communication between the fluid passage 5 and the drain passage 8 is established only when an upstream valve 10 is opened. The downstream valve 10 is normally held closed by the spring 19' and may be opened by energization of the core assembly, 3' and the coil assembly 4'.

The valve 9 (10) has a valve body 9a (10a) and a seat 12 (13). The valve 9 (10) is in a closed condition when the valve body 9a (10a) rests on the seat 12 (13) and is in an opened condition when the valve body 9a (10a) is spaced from the seat 12 (13). The seat 12 and the seat 13 are each formed at a lower portion of a receiving portion 11 formed within the housing 2. Each receiving portion 11 has a reverse tapered portion or a conical surface 11a which expands toward the bottom portion of the housing 2. In parallel with the valve 9, a one-way valve 14 is provided in order to maintain a pressure in the fluid passage 5 less than the pressure at the inlet port 6.

The core assembly 3 has a stainless steel casing 15 defining a blind bore. Within the casing 15, there are accommodated a stationary core 16, a movable plunger 17, a rod 9b connected to the plunger 17 after passing through the stationary core 16, and the spring 19 disposed between the stationary core 16 and the movable plunger 17 for urging the rod 9b in the opening direction. The valve body 9a is formed at a lower end of the rod 9b. The lower end of the ceasing 15 is open and has an outward expanding tapered portion 15a. The stationary core 16 has a tapered portion 16b opposed to the tapered portion 15a of the casing 15 in a parallel relationship. Between the tapered portion 15a of the casing 15 and the tapered portion 16a of the stationary core 16, there is inserted or fitted a cylindrical iron or steel spacer 20 whose cross-section has a wedge shape so that the casing 15 is in fact fixed to the receiving portion 11 of the housing 2.

Figure 4:
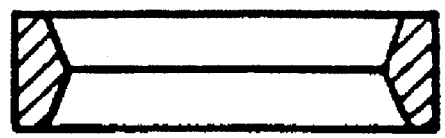
FIG. 4 is a cross-sectional view of a spacer.
Figure 5:
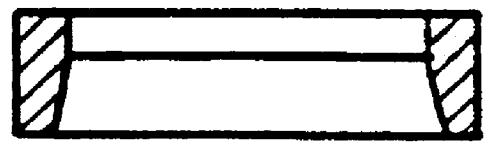
FIG. 5 is a cross-sectional view of a modified spacer.

The spacer 20 shown in FIG. 1 has been deformed by its insertion between the tapered portions 15a and 16a. Examples of undeformed spacers are shown in FIGS. 4 and 5.

The coil assembly 4 has a bobbin 22 around which a coil 21 is wound and a yoke 23 surrounds the bobbin 22 without defining a clearance therebetween.

The core assembly 3' and coil assembly 4' are identical to the core assembly 3 and core assembly 4 except as follows. The bush 25 is a modification of the stationary core 16. That is to say, the bush 25 holds a movable core 27 mounted on a rod 10b having the valve body 10a at a lower end thereof. The movable core 27 is pressed downward by the spring 19' pressed against the stationary core 16'.

Next, assembly of the electromagnetic valve device 1 will be described hereinbelow. First, the core assembly 3 (3') is inserted into the receiving portion 11 in such a manner that the stationary core 16 (bush 25), the movable are temporarily accommodated within the casing 15 (15').

During this process, an acute edged projection 16a formed on a bottom of the stationary core 16 is pressed into the housing 2, thereby establishing a fluid-tight connection between the housing 2 and the stationary core 16. Similarly, at the downstream side, as seen from FIG. 2, an acute edged projection 25a formed on a bottom of the bush 25 is pressed into the housing 2, thereby establishing a fluid-tight connection between the housing 2 and the bush 25.

In order to establish a fluid-tight relationship between the stationary core 16 and the casing 15, the cylindrical spacer 20 is inserted between the tapered portion 15a of the casing 15 and the tapered portion 16b of the stationary core 16 and is thereby deformed. Due to the wedge shape of the spacer 20, the casing 15 is urged or pressed downwardly onto the stationary core 16, which creates a fluid-tight relationship therebetween. This also presses the stationary core down onto the housing 2 to maintain the fluid-tight relationship. Insertion of the cylindrical spacer also establishes a simultaneous connection of the core assembly 3 to the housing 2. At the downstream side, an insertion of the spacer 20 will similarly create a fluid-tight relationship between the bush 25, the casing 15 and the housing 2.

Figure 3:
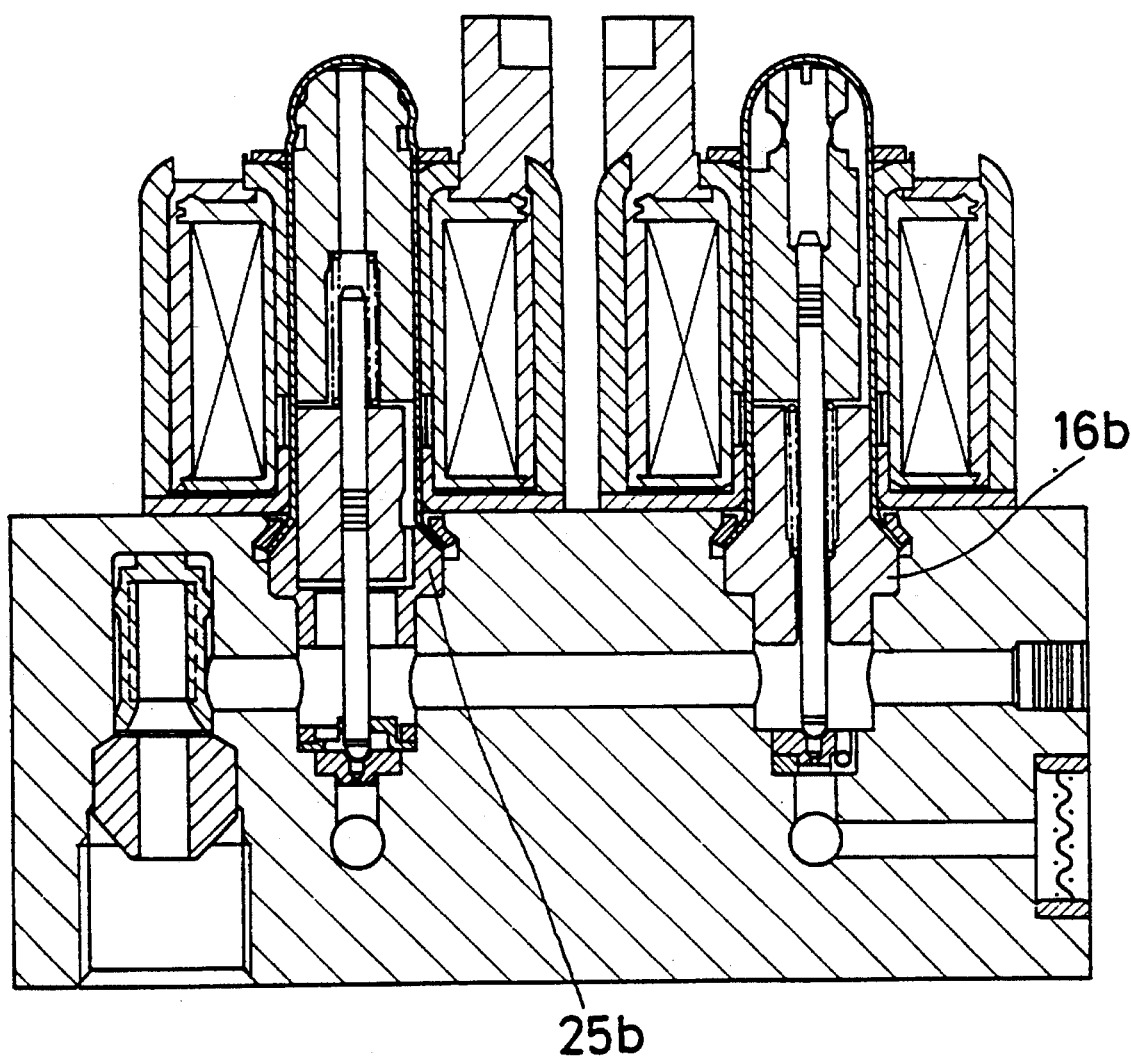
FIG. 3 is a cross-sectional view of a modified electromagnetic valve.

In the embodiment of FIG. 3 the fluid-tight connection between the housing 2 and the stationary core 16 is enhanced by a press fit or snug fit of an enlarged radial portion 16b of the stationary core 16 into the portion 11 in a radial sealing manner. Similarly, in order to enhance the fluid-tight connection between the housing 2 and the bush 25, there is a press fit or snug fit of an enlarged radial portion 25b of the bush 25 into the portion 11.

It is to be noted that if the spacer 20 may have the forms shown in FIGS. 4 and 5. Adjusting the shape of the wedge angle of the spacer 20 can solve design tolerance problems.

Subsequent to the completion of inserting the spacer 20 as mentioned above after fitting the core assembly 3 into the portion 11, the coil assembly 4 is mounted around the core assembly 3 and is secured thereto by a washer 24.

In light of the fact the operation of the electromagnetic valve, per se, is not of concern in the present invention, its explanation will be omitted.

As mentioned above, in accordance with the present invention, inserting or fitting the spacer having a wedge shaped cross-section between the housing and the stationary member will provide fluid-tight sealing of the core assembly with the casing, so that other parts such as an 0-ring or additional machining process are not required. In addition, it is to be noted that the insertion of the spacer establishes a simultaneous connection of the core assembly to the housing.

The invention has thus been shown and described with reference to reference specific embodiments, however, it should be noted that the invention is in no way limited to the details of the illustration structures but changes and modifications may be made without departing from the scope of the appended claims.

What is claimed as new and desired to be secured by Letters Patent of the United States is:

1. An electromagnetic valve device comprising:

a housing having a fluid passage formed therein;

a receiving portion formed in the housing and including a bottom portion and a conical inner surface adjacent to the fluid passage;

a core assembly accommodated within the receiving portion and including a stationary member having a bottom mounted on the bottom portion of the receiving portion and a conical outer surface expanding toward the bottom of the stationary member, a valve body extending from the stationary member and serving for opening and closing the fluid pressure passage, and a casing having a conical open end mounted on the conical outer surface of the stationary member;

a coil assembly positioned for moving the valve body; and an annular spacer having a wedge shaped cross-section and fitted between the conical inner surface of the receiving portion and the conical open end of the casing, said spacer pressing on the casing in order to establish a fluid-tight relationship between the conical open end and the conical outer surface of the stationary member.

2. The electromagnetic valve device in accordance with claim 1, wherein the coil assembly surrounds the casing outside the housing.

3. The electromagnetic valve device in accordance with claim 2, wherein the bottom of the stationary member is held in fluid tight relationship with the bottom portion of the receiving portion by said annular spacer.

4. The electromagnetic valve device in accordance with claim 1, wherein the housing is made of an aluminum alloy.

5. The electromagnetic valve device in accordance with claim 1, wherein the annular spacer is made of a ferrous material.

6. The electromagnetic valve device in accordance with claim 1, wherein the casing is made of stainless steel.

7. The electromagnetic valve device in accordance with claim 1, wherein the bottom of the stationary member is in fluid tight relationship with the housing.

8. The electromagnetic valve device in accordance with claim 7, wherein the bottom of the stationary member is provided with an acute projection.

9. The electromagnetic valve device in accordance with claim 1, wherein the stationary member is snugly fitted into the receiving portion.

* * * * *